United States Patent
Inglis et al.

(10) Patent No.: US 7,844,960 B2
(45) Date of Patent: Nov. 30, 2010

(54) OPTIMIZING SOFTWARE PROGRAM EXECUTION DURING CLASS LOADING PHASE

(75) Inventors: Derek Bruce Inglis, Markham (CA); Marius Pirvu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1436 days.

(21) Appl. No.: 11/226,743

(22) Filed: Sep. 14, 2005

(65) Prior Publication Data
US 2007/0061793 A1  Mar. 15, 2007

(51) Int. Cl.
*G06F 9/45* (2006.01)
(52) U.S. Cl. .................. 717/153; 717/139; 717/148; 717/166
(58) Field of Classification Search .............. None
See application file for complete search history.

(56) References Cited

U.S. PATENT DOCUMENTS

| | | | |
|---|---|---|---|
| 6,324,687 B1 * | 11/2001 | Beadle et al. | 717/148 |
| 6,851,109 B1 | 2/2005 | Alexander, III et al. | |
| 6,851,111 B2 | 2/2005 | McGuire et al. | |
| 6,865,730 B1 | 3/2005 | Burke et al. | |
| 6,901,586 B1 | 5/2005 | Czajkowski et al. | |
| 7,150,012 B2 * | 12/2006 | Hill | 717/158 |
| 2004/0044995 A1 * | 3/2004 | Hickson | 717/148 |
| 2005/0155028 A1 * | 7/2005 | Park | 717/166 |

* cited by examiner

*Primary Examiner*—Michael J Yigdall
(74) *Attorney, Agent, or Firm*—Stephen R. Tkacs; Stephen J. Walder, Jr.; Libby Z. Toub

(57) ABSTRACT

A mechanism is provided for optimizing computer program execution during class loading phase. As a code method of the program is received for compiling prior to execution, a check is performed whether program execution is in class loading phase. Program execution is in class loading phase where the class loading rate exceeds a pre-determined level during a pre-determined interval. If the program is in class loading phase, then compiling is reduced by lowering frequency of just-in-time (JIT) compilation, lowering optimization level of just-in-time compilation, or a combination of the two. The code method may also be passed to an interpreter to be interpreted.

17 Claims, 2 Drawing Sheets

OPTIMIZING SOFTWARE PROGRAM EXECUTION DURING CLASS LOADING PHASE

FIELD OF THE INVENTION

The present invention generally relates to the field of computer software. More specifically, to a method, system and computer program product for optimizing computer program execution during class loading phase.

BACKGROUND

In order to execute computer software written in a high level language, there are two generally accepted means. The source code may be first compiled by using a compiler into the object code (machine executable instructions) which can then be executed on a specific hardware (or simulated hardware) platform. Examples of computer language which typically involve compilation are C or C++ and Fortran. Alternatively, the source code may be read by an interpreter, one line at a time, which directly causes the underlying hardware platform to carry out the instructions. LISP is one example of an interpreted computer language.

Some other computer program languages may be subject to a hybrid approach for achieving portability and performance. For example, Java™ has gained popularity as a computer language for producing "write once, run anywhere" software, in addition to its object oriented nature. (Java is a trademark of Sun Microsystems, Inc. in the United States, other countries, or both.) Java source code is first compiled into bytecode, an intermediate representation of the software, on any platform. This bytecode can then be taken to another platform for execution. At the second platform, Java byte-code is interpreted by a Java virtual machine, which supports Java components on the platform with basic Java functionality The interpretation process causes execution of the program to be slow. What has become widely available to improve the performance of Java code execution is to use a Java Just-in-Time compiler (JIT compiler). This compiler will then convert bytecode into native code which can be immediately executed on the platform. The term JIT is also used to describe any runtime compiler in a virtual machine, even if it is used selectively to compile some Java class methods while others are interpreted (see later).

The time required to execute native code instructions (i.e. programs) can be reduced by applying compiler optimizations. Common optimization techniques include inlining, loop unrolling, synchronization, and specialized methods for exception handling and virtual function calls. Furthermore, JIT compilers often determine the most performance-critical methods of the code and optimize heavily only those methods (Sun Microsystems. *The Java HotSpot Virtual Machine* v1.4.1. White paper, available at http://java.sun.com/products/hotspot/docs/whitepaper/Java_Hotspot_v1.4.1/Java_H-Spot_WP_v1.4.1__1002__1.html). Additionally, a JIT compiler can offer a higher optimization granularity by providing several optimization levels and using these levels according to the perceived method "hotness" (Michael G. Burke, Jong-Deok Choi, Stephen Fink, David Grove, Michael Hind, Vivek Sarkar, Mauricio J. Serrano, V. C. Sreedhar, Harini Srinivasan, and John Whaley, "The Jalapeno Dynamic Optimizing Compiler for Java", 1999 *ACM Java Grande Conference*, June 12-14). Of course, higher optimization levels take more time, but are expected to provide better performance.

The hotness of a Java method is usually determined relatively to the other methods of the application. If an application has a few hot-spots, they can easily be determined by an adaptive JIT compiler and optimized accordingly. However, some applications have a very flat execution profile with thousands of methods being more or less equally important. In such cases a JIT compiler cannot make discriminatory decisions and will have to spend a considerable amount of time compiling these methods (the alternative is to use fewer optimizations across the board, thus reducing compilation time, but adversely affecting the application's performance).

Despite improved code generation by the optimization techniques, the start-up (or initialization) time of a Java application is negatively impacted since this is the point when most of the compilation occurs. Large server-side applications that have thousands of methods which need to be compiled are especially susceptible to large start-up times. This invention addresses this problem and proposes a solution to reduce application initialization time while reducing the chances of affecting the runtime performance of the application.

Although the above is discussed in terms of a Java virtual machine, similar principles apply in the case of other environments.

SUMMARY OF THE INVENTION

In one illustrative embodiment, a method for optimizing execution of a software program during class loading phase comprises receiving a code method of the program for compiling. The method further comprises detecting whether program execution is in class loading phase. If the program is found to be in class loading phase, then compiling is reduced.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

These and other features of this invention will be more readily understood from the following detailed description of the various aspects of the invention taken in conjunction with the accompanying drawings in which like numbers denote like parts.

DETAILED DESCRIPTION OF THE INVENTION

Figure 1:
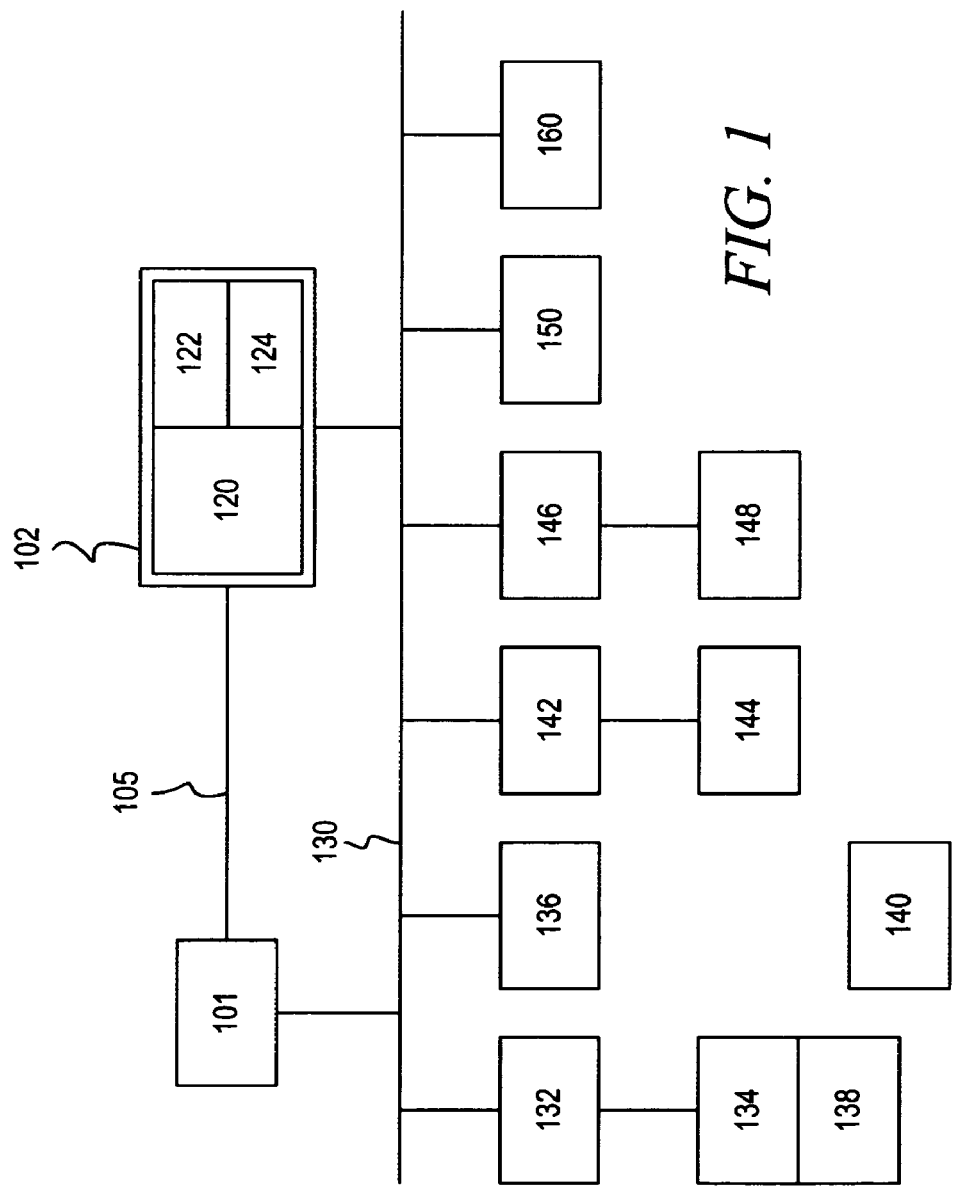
FIG. 1 depicts a system in which the present invention may be implemented.

With reference now to the figures, and in particular with reference to FIG. 1, a pictorial representation of a system in which the present invention may be implemented is depicted. Computer system 100 may comprise central processing unit (CPU) 101 which may be a programmable processor, executing instructions stored in memory 102. While a single CPU is shown in FIG. 1, computer systems having multiple CPUs may also be used. Memory 102 is connected to the CPU 101 through an internal bus 105 and/or an external system bus 130. Memory 102 may be a random-access semiconductor memory for storing data and programs; memory is shown conceptually as a single entity but memory may be arranged in a hierarchy of caches and other memory devices. Residing in memory 102 are Operating system 120 and applications 122. Operating system 120 provides, amongst others, functions such as device interfaces, management of memory pages, management of multiple tasks, etc. CPU 101 is suitably programmed to execute the operating system 120 and instructions of applications 122 retrieved from memory 102. Memory 102 has the necessary elements to carry out the preferred embodiment by having a JIT compiler 210 (see FIG. 2) as part of a virtual machine 124. Applications 122 may include legacy applications and if it includes a server software application, network interface 108 may interact with the server software application 122 to enable computer system 100 to be a network server.

Communication bus 130 supports transfer of data, commands and other information between different devices; while shown in simplified form as a single bus, it may be structured as multiple buses, and may be arranged in a hierarchical form. Display adapter 132 supports video display 134. Keyboard/pointer adapter 136 supports keyboard 138 and pointing device 140 depicted as a mouse (other forms of input devices could be used). Storage adapter 142 supports one or more data storage devices 144 which may be rotating magnetic hard disk drives, CD-ROM drives, or other data storage devices. Printer adapter 146 supports printer 148. Adapter 150 may connect a wide variety of peripheral devices to the computer system 100 and to other adapters connected to other devices such as, but not limited to, speakers, audio and visual equipment, tape drives, optical drives, printers, disk controllers, other bus adapters, PCI adapters, and workstations using one or more protocols known in the art. Network interface 160 provides a physical interface to a network, such as the Internet. This interface may comprise a modem connected to a telephone line through which an Internet access provider or online service provider is reached. For example, computer system 100 may be connected to another network server via a local area network using an Ethernet, Token Ring, or other protocol, the second network server in turn being connected to the Internet. Alternatively, network interface 160 may be provided through cable television, fiber optics, satellites, wireless, or other connections. The representation of FIG. 1 is intended as an exemplary simplified representation, it being understood that in other computer systems 100 many variations in system configuration are possible in addition to those mentioned here.

Finally, computer system 100 need not be a computer at all, but may be a simpler appliance-like client device, also called an embedded device, having less processing power and memory such as a network terminal, a thin client, terminal-like devices, a voice response unit, etc. A variety of pervasive mobile devices as clients may be used. Mobile architecture enables the multitude of clients including laptops, sub-notebooks, handheld computers such as personal digital assistants and companion devices, and mobile appliances such as smart-phones, pagers, simple messaging devices and wearable devices. When the computer system 100 is a mobile or an embedded device, the adapters 150 and network interfaces 160 support a variety of multi-modal interfaces including traditional keyboard and mouse interfaces, small text screens, pen, touch screens, speech recognition, text-to-speech and other emerging technologies like wearable devices. Such special-purpose devices for accessing the World Wide Web, such as an Internet access box for a television set, or a portable wireless web accessing device, which can implement an adapter for the purpose of communicating data to/from another computer system are also intended to be within the scope of a computer system 100.

As will be described in detail below, aspects of the preferred embodiment pertain to a specific method having steps implementable on a computer system 100. The computer system 100 is itself a further embodiment of the invention. An alternative embodiment implements the invention as a computer program-product for use with the computer system 100. The programs defining the functions of the preferred embodiment can be delivered to the computer system 100 and/or to the peripheral device for installation on a connected adapter via a variety of signal-bearing media, which include, but are not limited to: (a) information permanently stored on non-writable storage media, e.g., read only memory devices within either computer such as CD-ROM disks readable by CD-ROM; (b) alterable information stored on writable storage media, e.g., floppy disks within a diskette drive or a hard-disk drive; or (c) information conveyed to a computer by a telephone or a cable media network, including wireless communications. Such signal-bearing media, when carrying instructions that may be read by an adapter or a computer to direct the functions of the present invention, represent alternative embodiments.

In the case the software is written in the Java programming language, source code is submitted to a compiler. Java source code is compiled to generate bytecode. Typically, the compiler reads files with typically a ".java" extension; the generated bytecode is then saved in a file with typically a ".class" extension.

This invention is based on the phenomenon that during the course of execution, an application program may enter into phases when it loads certain classes, at a very high rate, which classes are unlikely to be executed again. Since just-in-time compilation for Java bytecode is computationally expensive due to the various optimization techniques, it is beneficial to reduce the amount of just-in-time compiling (or its optimization level) during these phases. Such a phase is denoted in this document as class loading phase. Note that a software application program can have several class loading phases during its execution. Consider for instance a middleware product, like an application server, which hosts several enterprise applications. At the start of each hosted application there will be a flurry of classes being loaded and methods being compiled. This invention in practice will make the application server look more responsive to a user, without sacrificing long term performance. Because class loading and JIT compilation are more intense during program start-up, this invention is expected to bring important savings to start-up time.

Figure 2:
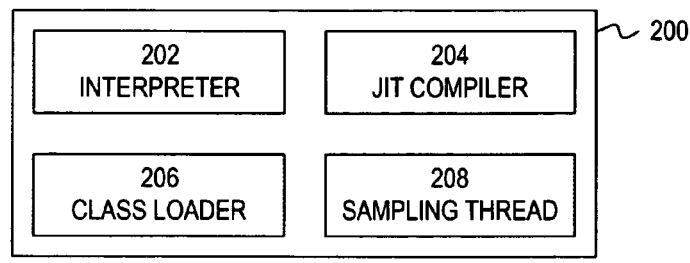
FIG. 2 depicts a block diagram showing the conceptual parts of a Java virtual machine in an exemplary embodiment of the present invention.

Depicted in FIG. 2 is a block diagram depicting the conceptual parts of a Java virtual machine 200 in an exemplary embodiment of the present invention. The Java virtual machine 200 comprises an interpreter 202, just-in-time compiler 204, class loader 206, and a sampling thread 208. Other possible components of the virtual machine 200 are not shown.

Figure 3:
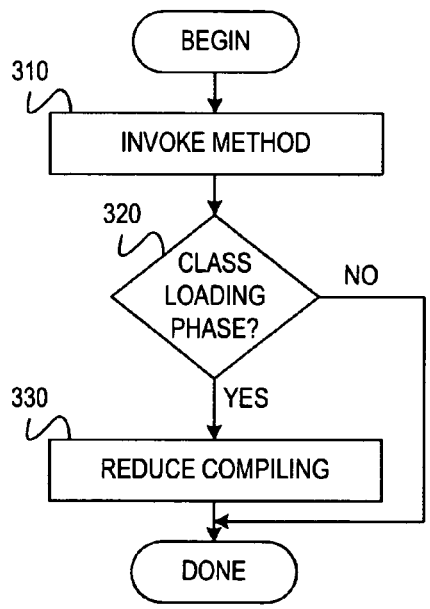
FIG. 3 illustrates a flowchart of a method in accordance with a preferred embodiment of the present invention.

FIG. 3 indicates the steps of a process in accordance with a preferred embodiment of the present invention. At step 310, the virtual machine 200, during execution of the application, invokes a method of a specified class, which is also denoted in this document as a code method. This results in the loading of the class by the class loader 206, which locates the binary form of the class with a particular class name. Class loader 206 (or the virtual machine 200) increments a counter for determining whether the execution is in class loading phase in step 320. At step 320, a check is performed whether execution is in class loading phase, for example by way of examining a classLoadingPhase flag. Subsequently, in step 330, compiling is reduced by for example, lowering frequency of JIT compilation, lowering optimization level of JIT compilation, or a combination of the two. Lowering frequency of JIT compilation includes queuing the compilation request and performing the compilation at a later time. JIT compilation for the method may also be precluded altogether as part of an extreme way of lowering frequency: the method would be passed to the interpreter 202 to be interpreted. The entire class may instead be affected, rather than one method at a time.

Figure 4:
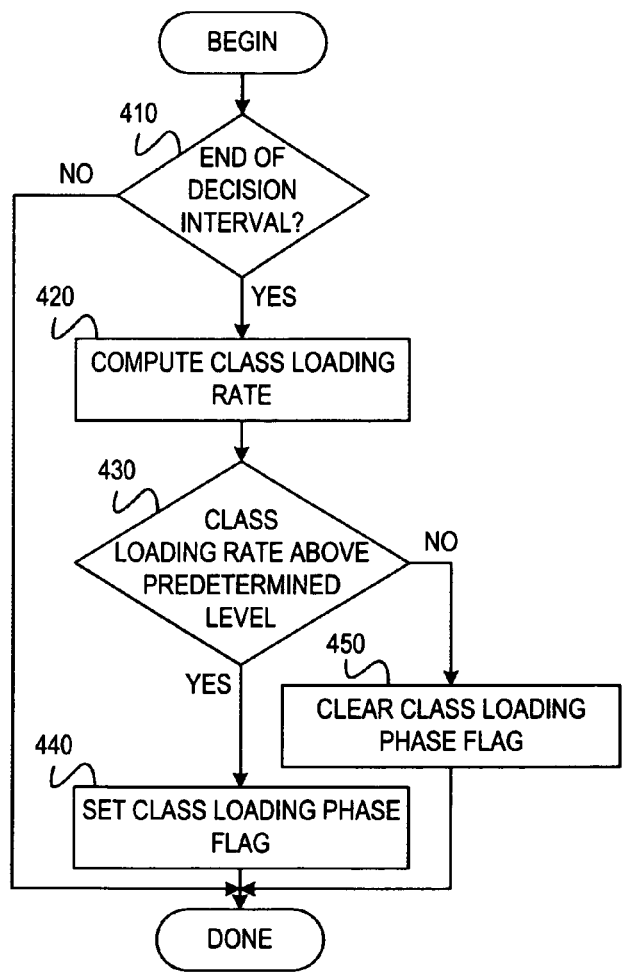
FIG. 4 illustrates a flowchart of a process for detecting class loading phase by a sampling thread.

FIG. 4 shows the process for detecting class loading phase by the sampling thread 208. The sampling thread 208 monitors the rate at which the virtual machine 200 loads classes. The timeline can be divided into back-to-back "decision intervals". At step 410, a check is made whether the end of a decision interval has been reached. At the end of a decision interval, the sampling thread 208 inspects the number of classes loaded so far and reads the current timestamp (e.g. the wall-clock time or the time spent in the current process), and computes the class loading rate for the decision interval that just ended (step 420). If the class loading rate is above a certain predetermined threshold (step 430), the sampling thread 208 will signal that the application is in class loading phase, e.g. setting a classLoadingPhase flag (step 440); otherwise it will clear it (step 450). Two parameters may tune this technique: (1) the length of the decision interval; and (2) the rate threshold used to determine whether or not a class loading phase started.

By reducing the compilation time selectively, the start-up time is reduced, while the application's performance is typically not degraded. Another advantage stems from the following: some aggressive compiler 204 optimizations rely on assumptions derived from the currently perceived class hierarchy. If the virtual machine 200 is loading classes at a high rate, those class hierarchy assumptions have a higher probability of being invalidated and the JIT compiler 204 is forced to take corrective actions, sometimes even to recompile the methods. All these extra steps can have a detrimental effect on performance and/or start-up time. Our invention is able to preclude these nuisances by reducing the number of such assumptions made during phases with high class loading activity.

The virtual machine 200 may be implemented either in software or in hardware (as a virtual machine chip). Other programming languages which may be either just-in-time compiled or interpreted are within contemplation of this invention. A code method is any individually addressable and loadable component of the application program.

While the present invention has been described in the context of a data processing system or method/process, those of ordinary skill in the art will appreciate that the present invention can also be worked in the form of a computer program product comprising computer readable medium of computer readable instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are nonspecific to a computer on which the instructions are to be executed. In such a case, a virtual machine 200 on the computer may interpret the instructions or send the instructions to a compiler to generate code suitable for execution by the computer on which the virtual machine is located. Furthermore, the inventive concept includes the reduction of any optimizing step for software execution, in addition to those for just-in-time compilation, performed during class loading phase. Once class loading phase is detected, these optimizing steps may be reduced in frequency or intensity depending on the circumstances.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for optimizing execution of a software program during class loading phase, comprising the steps of:
    receiving a code method of the program for compiling;
    detecting, by a sampling thread, whether program execution is in class loading phase, wherein program execution is in class loading phase if the class loading rate exceeds a predetermined level;
    reducing compiling responsive to the sampling thread detecting that program execution is in class loading phase; and
    returning compiling to a non-reduced state responsive to the sampling thread detecting that program execution is no longer in class loading phase.

2. The method of claim 1, wherein the step of reducing compiling comprises lowering frequency of JIT compilation.

3. The method of claim 1, wherein the step of reducing compiling comprises lowering optimization level of JIT compilation.

4. The method of claim 1, wherein the step of reducing compiling comprises lowering frequency of JIT compilation and lowering optimization level of JIT compilation.

5. The method of claim 2, wherein the step of lowering frequency of JIT compilation comprises interpreting the code method.

6. The method of claim 1, wherein the program is written in object oriented bytecode and execution is performed by a virtual machine.

7. The method of claim 1, wherein the program is an application server.

8. A system for optimizing execution of a software program during class loading phase, comprising:
    a processor; and a memory coupled to the processor, wherein the memory comprises instructions which, when executed by the processor, cause the processor to:

receive a method of the program for compiling;

detect, by a sampling thread, whether program execution is in class loading phase, wherein program execution is in class loading phase if the class loading rate exceeds a predetermined level;

reduce compiling responsive to the sampling thread detecting that program execution is in class loading phase; and return compiling to a non-reduced state responsive to the sampling thread detecting that program execution is no longer in class loading phase.

9. The system of claim 8, wherein reducing compiling comprises lowering frequency of JIT compilation.

10. The system of claim 8, wherein reducing compiling comprises lowering optimization level of JIT compilation.

11. The system of claim 8, wherein reducing compiling comprises lowering frequency of JIT compilation and lowering optimization level of JIT compilation.

12. The system of claim 9, wherein lowering frequency of JIT compilation comprises interpreting the method.

13. The system of claim 8, wherein the program is written in object oriented bytecode and execution is performed by a virtual machine.

14. The system of claim 8, wherein the program is an application server.

15. A computer program product for optimizing execution of a software program during class loading phase, comprising a computer recordable medium having a computer readable program stored thereon, wherein the computer readable program, when executed on a computing device, causes the computing device to:

receive a code method of the program for compiling;

detect, by a sampling thread, whether program execution is in class loading phase, wherein program execution is in class loading phase if the class loading rate exceeds a predetermined level;

reduce compiling responsive to the sampling thread detecting that program execution is in class loading phase; and return compiling to a non-reduced state responsive to the sampling thread detecting that program execution is no longer in class loading phase.

16. The computer program product of claim 15, wherein reducing compiling comprises lowering frequency of JIT compilation or lowering optimization level of JIT compilation.

17. The computer program product of claim 15, wherein the program is written in object oriented bytecode and execution is performed by a virtual machine.

* * * * *